United States Patent [19]

Fukuhara et al.

[11] E Patent Number: Re. 32,376

[45] Reissued Date of Patent: Mar. 17, 1987

[54] EXPOSURE CONTROL APPARATUS FOR CAMERA PROVIDED WITH MULTI METERING DEVICE

[75] Inventors: Toru Fukuhara, Isehara; Takashi Saegusa, Sagamihara; Koichi Higashi, Kawasaki, all of Japan

[73] Assignee: Nippon Kogaku K.K., Tokyo, Japan

[21] Appl. No.: 562,822

[22] Filed: Dec. 19, 1983

Related U.S. Patent Documents

Reissue of:

[64] Patent No.: 4,306,787
Issued: Dec. 22, 1981
Appl. No.: 208,039
Filed: Nov. 18, 1980

[30] Foreign Application Priority Data

Nov. 22, 1979 [JP] Japan ..... 54-151467
Aug. 28, 1980 [JP] Japan ..... 55-118922

[51] Int. Cl.[4] ..... G03B 7/08
[52] U.S. Cl. ..... 354/432; 356/222
[58] Field of Search ..... 354/429, 430, 431, 432, 354/286; 356/222

[56] References Cited

U.S. PATENT DOCUMENTS 3,994,595 11/1976 Nobusawa ..... 356/222
4,182,573 1/1980 Yamada et al. ..... 354/432
4,214,826 7/1980 Uchida et al. ..... 356/222
4,285,583 8/1981 Canter ..... 354/432
4,285,584 8/1981 Canter ..... 354/432

FOREIGN PATENT DOCUMENTS 0123030 9/1979 Japan ..... 354/432

*Primary Examiner*—Russell E. Adams
*Attorney, Agent, or Firm*—Shapiro and Shapiro

[57] ABSTRACT

An improved exposure control apparatus for camera comprises a metering circuit, exposure operational circuit, correction value calculating circuit and correction operational circuit. The metering circuit meters a plural number of divisional sections of the field of an object and generates a plural number of photoelectric outputs corresponding to the respective sections of the field. The exposure operational circuit calculates an exposure value from the plural number of photoelectric outputs. The correction value calculating circuit calculates correction values for correcting the distribution characteristics of said photometric outputs relative to the distribution characteristics of illumination on the focal plane of the photographing lens of the camera at the time of photographing, the correction values corresponding to the sections of the field respectively. The correction operational circuit makes a correction to the respective photoelectric outputs in accordance with the respective correction values found by above calculation.

20 Claims, 20 Drawing Figures

EXPOSURE CONTROL APPARATUS FOR CAMERA PROVIDED WITH MULTI METERING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an exposure control apparatus for a camera and more particularly is directed to an improvement in such exposure control apparatus provided with multi metering means in which a plural number of divisional sections of an object field are metered photometrically to obtain a plural number of photoelectric outputs corresponding to the respective sections and a proper photometer output is operated and extracted from the photoelectric outputs to determine a proper exposure value for the whole object field.

2. Description of the Prior Art

The above mentioned type of multi metering device is well known in the art and there have been proposed various multi photometers for this purpose one example of which is disclosed in Japanese Patent Application laid open No. 12,828/1977 (its corresponding German Patent Laid Open Specification is DOS P No. 2,632,893).

However, all of the improvements hitherto proposed for such type of divisional photometer have been directed solely to an operational method and apparatus for calculating a proper exposure value from a plural number of informations obtained by photometering.

In practical use of known multi photometers in a camera, there arises such problem that the photoelectric outputs from the multi photometer can not be used directly as a proper photometer output because of the difference between the distribution of the photoelectric outputs in the object field and the distribution of illumination on the film plane. Hereinafter, the object field is referred to as the picture plane.

In TTL open aperture metering, the above problem becomes particularly important. In this case, the difference between the distribution of photoelectric outputs obtained at the time of TTL photometering with fully open aperture and the distribution of illumination on the film plane obtained at the time of photographing with an aperture value then actually used becomes remarkably large and therefore the difference can not be ignored at all. This problem occurs even when the light receiving plane for multi metering is disposed conjugated with the film plane. Since a light receiving optical system is provided for the former plane, the above mentioned undesirable phenomenon can not be avoided even in such case.

In the conventional photometering apparatus operable with one photoelectric output, the central part of a picture plane has been used as a main area to be metered. Since the central area of a picture plane generally exhibits good proportionality to lens aperture for both of the photoelectric output from the photo receptor and the illumination on the film plane, the above mentioned difference in distribution has no remarkable effect on the determination of proper exposure value. Therefore, in this single type of photometer it is seldom that such difference in distribution leads to exposure error. In contrast, in the case of multi photometer, the peripheral part of a picture plane is also to be metered independently of the main part and therefore the difference in distribution mentioned above can not be ignored.

As an example, it is assumed that a picture plane is divided into segments in the form of 4×6 matrix as shown in FIG. 1 and these 4×6 segments are to be metered by photo receptors P11 to P46 respectively. If the object is a surface having a uniform brightness all over, then the distribution of photoelectric output along A-A' in the picture plane shown in FIG. 1 will give a curve as shown in FIG. 2A. As seen from FIG. 2A, the level of photoelectric output drops down gradually from the center of the picture plane to both side end portions due to the vignetting effect of the lens and the effect of so-called $Cos^4$ law (in FIGS. 2A and 2B, the distribution is plotted with the center of the picture plane as 0 and the locations of metered segments within the picture plane as the abscissa). However, when the aperture is stopped down for actually taking a picture, the effect of vignetting disappears and the distribution of illumination on the film plane gives a flattened curve (FIG. 2B) as compared with the curve of FIG. 2A. To obtain a proper exposure value, this difference between the distribution curves FIG. 2A and FIG. 2B has to be taken into consideration. Otherwise, the metered brightness for the peripheral sections of a picture plane will be unduly darker value than the real brightness thereof. This may lead the exposure to error. All the multi photometered hitherto proposed have no means for solving the problem.

SUMMARY OF THE INVENTION

Accordingly, it is an object of the invention to provide a multi metering apparatus which enables minimization of the above exposure error.

It is another object of the invention to provide a multi metering apparatus with which the possibility of exposure error mentioned above can be minimized by correcting the photoelectric outputs from a plural number of photo receptors so as to approximate the distribution thereof to the distribution of illumination on the film plane appearing at the time of the shot or exposure.

Other and further objects, features and advantages of the present invention will appear more fully from the following description of preferred embodiments with reference to the accompanying drawings.

DESCRIPTION OF PREFERRED EMBODIMENTS

Figure 13:
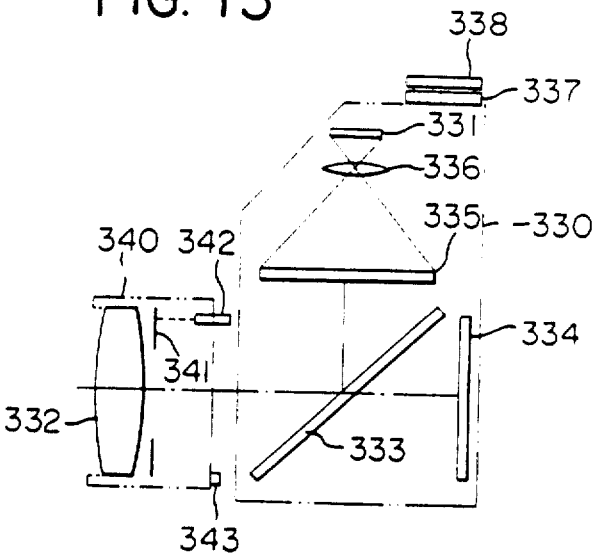
FIG. 13 is a schematic illustration of light receiving optical system in a camera to which the present invention is applied.

Referring first to FIG. 13 description is made of an example of a light receiving optical system mounted in a single lens reflex camera. To a camera body 330 is mounted detachably an interchangeable lens having a lens barrel 340. Light from an object to be photographed passes through a photographing lens system 332 in the lens barrel 340 and then is reflected by a movable mirror 333 toward a finder screen 335 on which the light is focused. When the movable mirror 333 is turned up to its retracted position in link with a photographing operation, the object light is focused on a film plane 334. The image of the object formed on the finder screen 335 is refocused on a surface 331 formed by a plural number of photoelectric elements through a refocusing lens 336.

Figure 3:
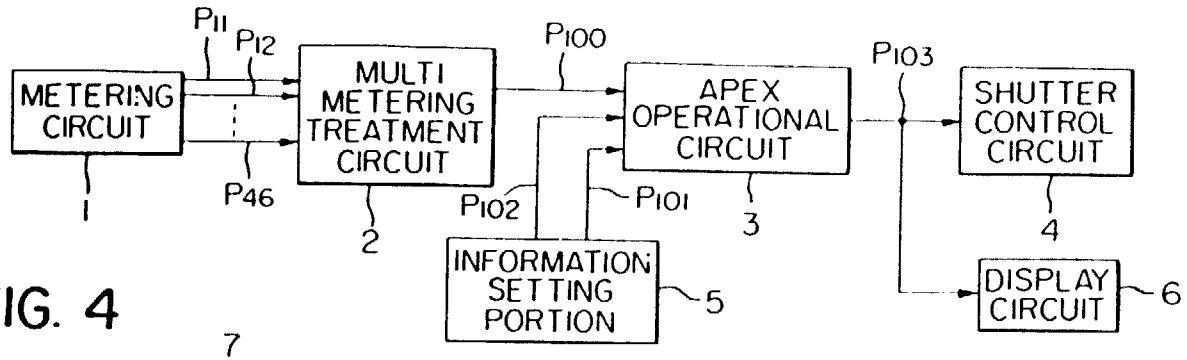
FIG. 3 is a block diagram illustrating the principle of the multi metering apparatus according to the invention.

FIG. 3 shows the basic arrangement of a multi metering apparatus. Flow of signals for automatic control of shutter speed in aperture priority mode will be described hereinafter with reference to FIG. 3. In the following description there are used terms in APEX notation which include luminance value BV, aperture value AV, ASA speed value SV and time value TV.

Figure 1:
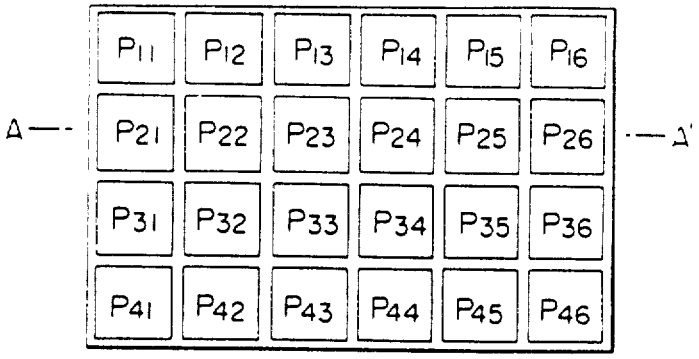
FIG. 1 shows a pattern of light receiving surface divided into a plural number of sections.
Figure 2A:
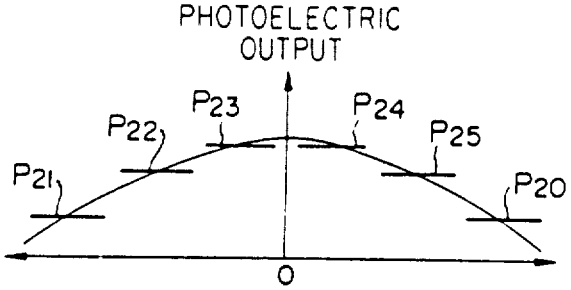
FIG. 2A is a graph showing the distribution of photoelectric output obtained therefrom.
Figure 2B:
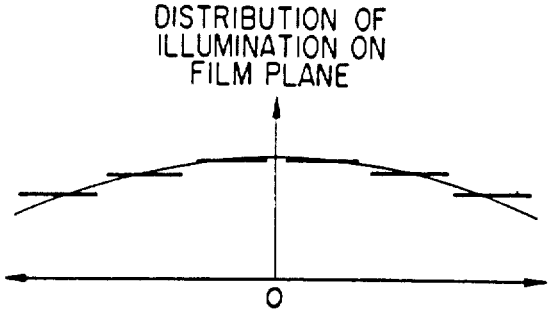
FIG. 2B is a graph showing the corresponding distribution of illumination on the film plane.

The multi metering apparatus shown in FIG. 3 comprises a metering circuit 1, multi metering treatment circuit 2, APEX operational circuit 3, shutter control circuit 4, information setting portion 5 and display circuit 6. When TTL metering with fully open aperture is carried out for the divisional sections of a picture plane as shown in FIG. 1, there are obtained from the metering circuit 1 the following photoelectric outputs corresponding to the individual metered sections;

$$P11 = BV11 - AV0,\ P12 = BV12 - AV0, \ldots,\ P46 = PV46 - AV0$$

wherein the same number indicates the correspondency between photo receptor and photoelectric output from it.

The multi metering treatment circuit 2 receives these outputs and carries out a series of operations and treatments to calculate an operational output P100 = BVans − AV0 as an estimated value for proper exposure. Examples of such circuit are disclosed in Japanese Patent Application laid open No. 12,828/1977 and U.S. Ser. No. 123,209 filed by the present applicant (its counterpart is DOS P. No. 3,007,575).

The APEX operational circuit 3 receives information of film sensitivity P101 = SV and information of aperture P102 = (AV − AVO) from the information setting portion 5 as well as the above operational output P100 = BVans − AV0 relating to the brightness from the circuit 2, and carries out the following APEX operation:

$$(BVans - AV0) + SV - (AV - AV0) = BVans + SV - AV = TV (= P103). \quad (1)$$

The resultant TV value is introduced into the shutter control circuit 4 to control shutter speed. Also, it is put into the display circuit 6 to display the shutter speed.

Figure 4:
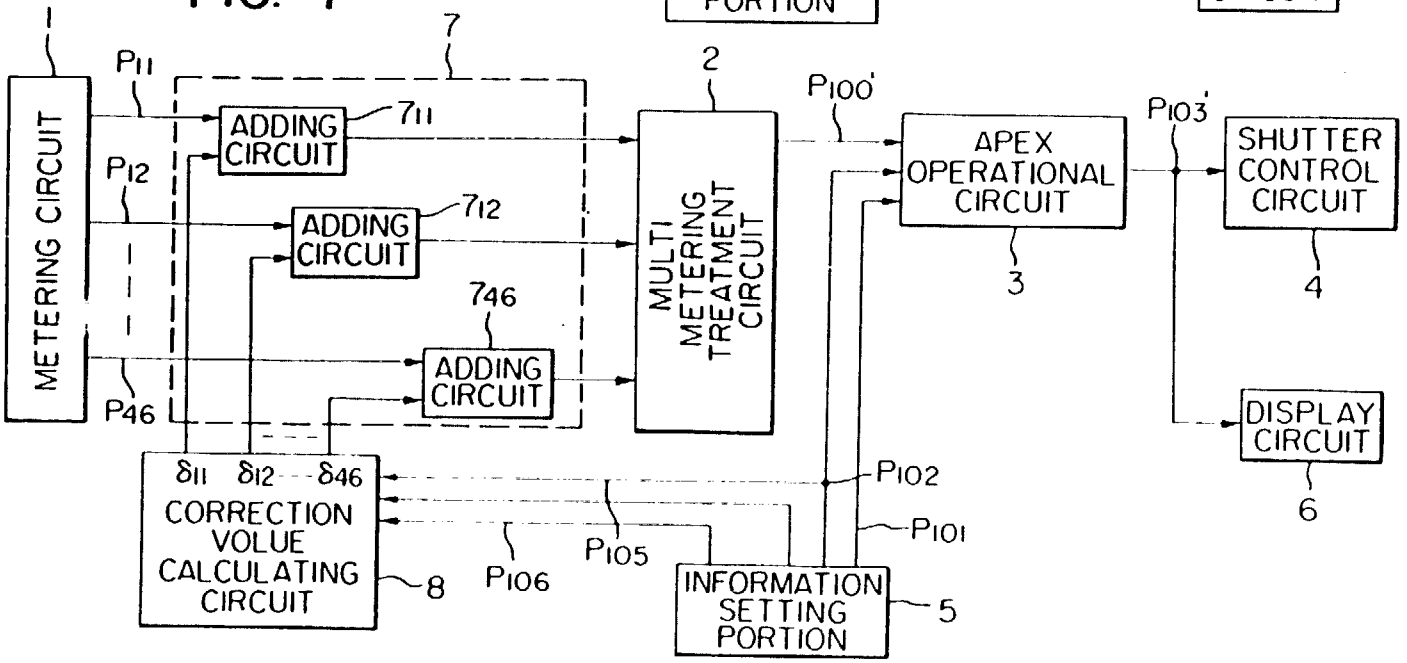
FIG. 4 is a block diagram of a first embodiment of the invention.

FIG. 4 is a block diagram of a multi metering apparatus as formed by applying the present invention to the circuit shown in FIG. 3. A correction operational circuit 7 and a correction value calculating circuit 8 are added to the circuit shown in FIG. 3.

In the multi metering apparatus shown in FIG. 4, the correction value calculating circuit 8 receives from the information setting portion 5 information of the diameter of open aperture P105 = AV0, information of aperture step number P102 = AV − AV0 and signal P106 = L informing of particular characteristics owing to the optical system of the lens. From these informations, the circuit 8 calculates correction values δ11 . . . δij . . . δ46 corresponding to the respective photoelectric outputs P11 . . . Pij . . . P46 from the respective sections. δij is given by the following general formula:

$$\delta ij = f(AV0,\ AV - AV0,\ L) \quad (2)$$

Above general formula is experimentally obtainable.

The correction operational circuit 7 comprises adders $7_{11}, \ldots 7ij, \ldots 7_{46}$ which carry out adding the outputs $\delta_{11} \ldots \delta_{ij} \ldots \delta_{46}$ from the circuit 8 to the outputs P11, . . . Pij . . . P46 from the circuit 1 respectively.

Let the photoelectric outputs from the metering circuit be represented generally in the matrix form by $$[Pij] = \begin{bmatrix} P11 \ldots P16 \\ \vdots \\ Pij \\ \vdots \\ P41 \ldots P46 \end{bmatrix} = \begin{bmatrix} BV11 - AV0, \ldots BV16 - AV0 \\ \vdots \\ BVij - AV0 \\ \vdots \\ BV41 - AV0, \ldots BV46 - AV0 \end{bmatrix} \quad (3)$$

and let the outputs from the correction value calculating circuit be represented by $$[\delta ij] = \begin{bmatrix} \delta 11 \ldots \delta 14 \\ \vdots \\ \delta ij \\ \vdots \\ \delta 41 \ldots \delta 46 \end{bmatrix} \quad (4)$$

Then, the operation carried out by the correction operational circuit 7 can be represented by $$[Pij] + [\delta ij] = \begin{bmatrix} P11 + \delta 11 \ldots P16 + \delta 16 \\ Pij + \delta ij \\ P41 + \delta 41 \ldots P46 + \delta 46 \end{bmatrix}$$

$$= \begin{bmatrix} BV11 - AV0 + \delta 11, \ldots BV16 - AV0 + \delta 16 \\ BVij - AV0 + \delta ij \\ BV41 - AV0 + \delta 41, \ldots BV46 - AV0 + \delta 46 \end{bmatrix}$$

$$= \begin{bmatrix} BV11' - AV0, \ldots BV16' - AV0 \\ BVij' - AV0 \\ BV41' - AV0, \ldots BV46' - AV0 \end{bmatrix}$$

wherein Bij' − AV0 means a photoelectric output after correction.

Consequently, the corrected photoelectric outputs P111=BV11'−AV0, . . . P146=BV46'−AV0 are introduced into the multi metering treatment circuit 2 from the correction operational circuit 7 and then a proper exposure value P100'=BV'ans−AV0 is calculated by the circuit 2. Since the exposure value is found by calculation on the basis of corrected photoelectric outputs in this embodiment, it is much more proper than that obtainable by the apparatus shown in FIG. 3. Sequence subsequent to it in the apparatus shown in FIG. 4 is the same as in the apparatus shown in FIG. 3.

The information setting portion 5 is formed in the following manner:

In FIG. 13, the reference numeral 342 designates an aperture stop driving pin interlocked with an aperture stop 341 for the photographing lens system 332. The information setting portion 5 takes up the informations of AV0, AV−AV0 and L from the motion of the aperture stop driving pin 342 or from a signal pin 343 provided on the lens mount. Similarly, the information setting portion 5 takes up the information SV from ASA film sensitivity setting dial 337 mounted on the camera body and the information TV from the shutter speed setting dial 338.

Hereinafter a detailed description is made as to what corrections are required.

Figure 5A:
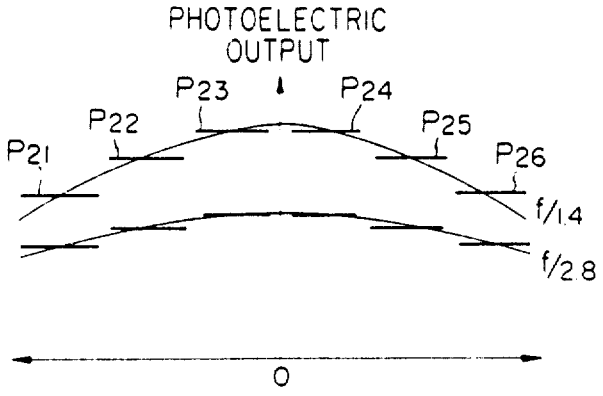
FIGS. 5A, B and C, 6A, B and C, and 7A, B and C show the distribution of photoelectric output, that of illumination on the film plane and that of correction value to the respective sections of the picture plane.

As an example, at first such case is considered wherein pictures of a surface having a uniform brightness are to be taken with use of two different lenses which have different open aperture values but have the same focal length. FIG. 5A shows the distributions of photoelectric outputs obtained when a lens of fully open aperture f/1.4 and another lens of f/2.8 are used respectively. The distributions are plotted with the photoelectric output as the ordinate and with the positions of the respective segments as the abscissa the origin "O" of which represents the center of the picture plane. As to the abscissa, the same is applied also to FIGS. 5B and 5C of which the ordinate is illumination on film plane (FIG. 5B) or correction value (FIG. 5C).

As seen from FIG. 5A and as a matter of course, the photoelectric output produced in photometering with the aperture open using the lens having a larger relative aperture, f/1.4 is higher than that produced using the smaller aperture lens, f/2.8. However, because of vignetting, the drop in photoelectric output at the peripheral area of the picture plane becomes more remarkable in the case of larger aperture than in the case of smaller aperture.

Figure 5B:
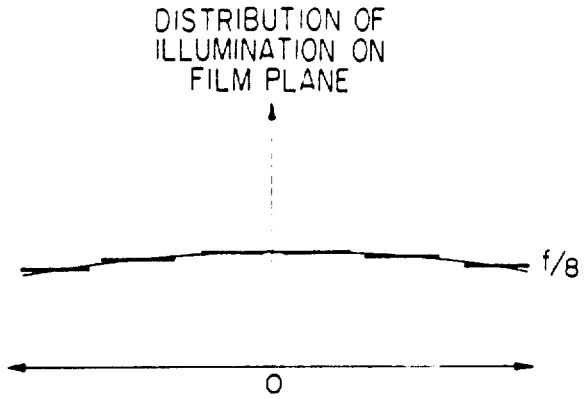
Figure 5C:
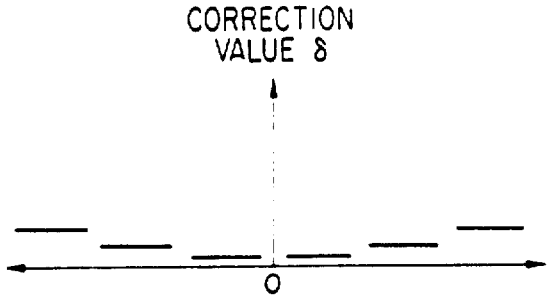

FIG. 5B shows the distribution of illumination of film plane obtained when a picture of the same object surface is taken through the lens whose aperture is stopped down to f/8. In this case, as seen from FIG. 5B, the distribution curve becomes almost flat for either of the two lenses. This means that for multi metering a particular treatment is required to transform the distribution of photoelectric output shown in FIG. 5A into that as shown in FIG. 5B.

This problem is solved in the following manner:

At first a reference lens (for example, f/2.8 lens) is preselected and using the selected lens the difference between the output in FIG. 5A and the output in FIG. 5B is determined. More particularly, one preliminarily knows the difference in output level between the photoelectric output at the time of fully open aperture metering and the output of illumination on film plane at the time of actual photographing with the aperture being stopped down to a certain step for the selected reference lens. This known difference constitutes a reference amount. Secondly, one finds out the difference in photoelectric output between two different lenses as shown in FIG. 5A to correct the difference caused by the difference in fully open aperture value between two lenses. Using the known difference, correction values are obtainable. FIG. 5C shows the distribution of correction value obtained in this manner. As seen from FIG. 5C, a larger correction value is applied to the photoelectric output derived from a remotor segment from the center of the picture plane, for a larger relative aperture lens. Here, it should be noted that the correction value for the central area of the picture plane is not 0 (zero) in FIG. 5C. This means that even at the central area the relation between photoelectric output and illumination on film plane does not correspond to the nominal step number for aperture value.

Application of the above correction values is carried out depending upon whether the fully open aperture information P105=AV0 is large or small which is delivered from the information setting portion 5 in FIG. 4. When the lens is of a larger relative aperture, a larger correction value is applied to the peripheral area output.

Figure 6A:
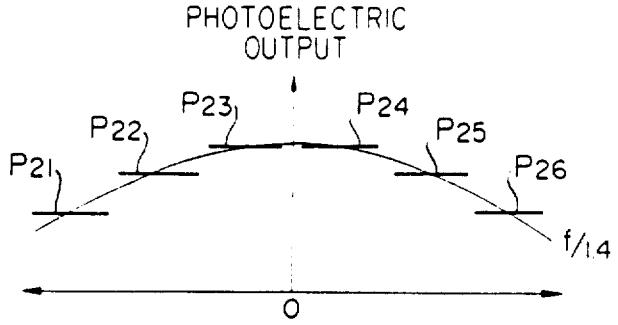
Figure 6B:
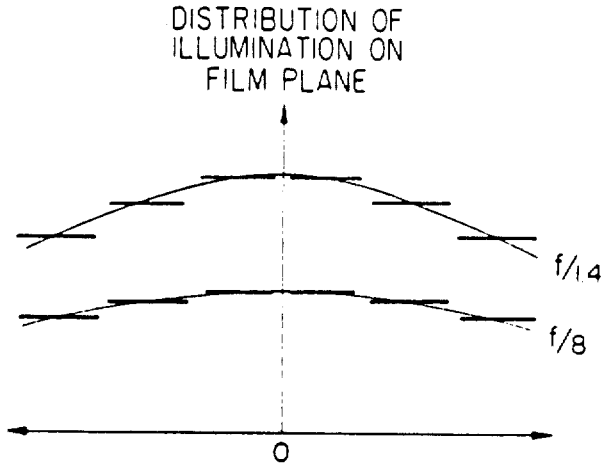
Figure 6C:
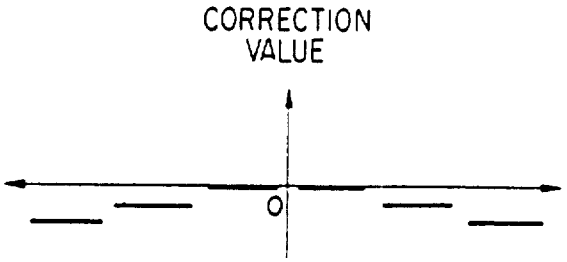

FIG. 6 shows another case wherein pictures of a surface having a uniform brightness are to be taken using the same lens but changing its aperture value variously. Similarly to the above case, FIG. 6A shows the distribution of photoelectric output, FIG. 6B the distribution of illumination on film plane and FIG. 6C the distribution of correction value obtained in this case.

Since the same lens is used, there appears only one distribution of photoelectric output for every metering with fully open aperture as shown in FIG. 6A. However, the effect of vignetting on the distribution of illumination on the film plane varies depending upon the aperture value then used for actual photographing as shown in FIG. 6B. In particular when an aperture value at or near the fully open aperture is used, the drop in illumination output is much more remarkable as compared with other aperture values. Usually, pictures are taken with aperture values stopped down over a certain value. Therefore, it is required to use said certain aperture value as a reference value and to make a correction in such manner that in the case of taking a picture with an aperture value near the open aperture value of the lens, the photoelectric outputs from the peripheral sections of the picture plane can be corrected in the direction of minus(−) as shown in FIG. 6C.

Application of above correction is carried out depending upon whether the aperture step number information P102=AV−AV0 is large or small which is delivered from the information setting portion 5 in FIG. 4.

Figure 7A:
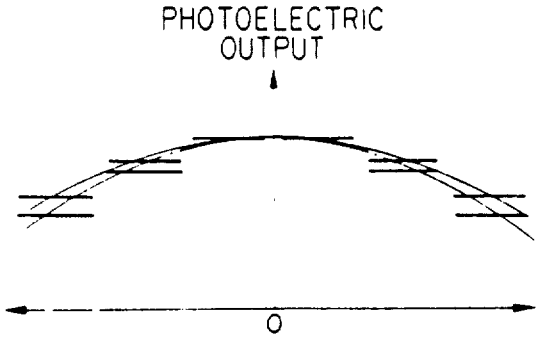
Figure 7B:
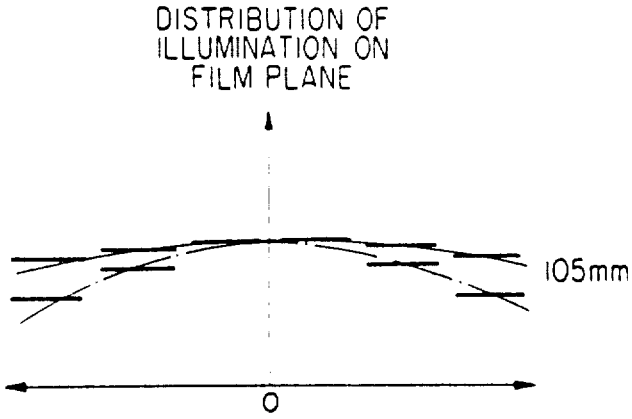
Figure 7C:
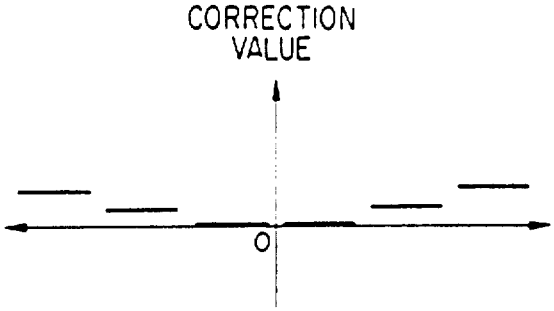

FIG. 7 shows such case wherein pictures of a surface having a uniform brightness are to be taken using two different kinds of lenses which have different optical systems while the fully open apertures are entirely the same. Pictures are taken with the same aperture value in this case. Again, FIG. 7A shows the distribution of photoelectric output, FIG. 7B that of illumination on film plane and FIG. 7C that of correction value.

As seen from FIG. 7A, there is no remarkable difference in photoelectric output between a lens having a longer focal length and a reference lens. However, when the aperture is stopped down for actual photographing, a considerable drop in illumination on film is observed at the peripheral areas for the reference lens which is caused by the effect of $Cos^4$ law. On the contrary, for the lens of longer focal length, the distribution of illumination on the film plane gives a nearly flattened curve (FIG. 7C).

Therefore, when the lens having a longer focal length is used with an aperture value other than its fully open value, it is required to correct the photoelectric outputs from the peripheral sections of the picture plane in the direction of plus (+) in an amount corresponding to the difference between the output in FIG. 7A and the output in FIG. 7B, as shown in FIG. 7C.

Application of this correction is made depending upon the lens characteristics information signal P106=L which is delivered from the information setting portion 5. This signal L=P106 may be of, for example, focal length or distance of exit pupil of the lens. This signal is introduced into the correction value calculating circuit 8 to make it calculate those correction values which can not be represented by AV0 (=P105) or AV−AV0 (=P102).

In point of photometering only, what the signal L (=P106) has to do is only to transmit the correction value of the lens for metering. However, considering various automations on the camera, there are required a larger number of signals. We have paid particular attention to this point and found that various purposes of correction can be attained by using such signal informing of data about the focal length of lens then used. Use of L (=P106) as focal length signal has an advantage that it may be used for other purposes than metering.

Figure 8:
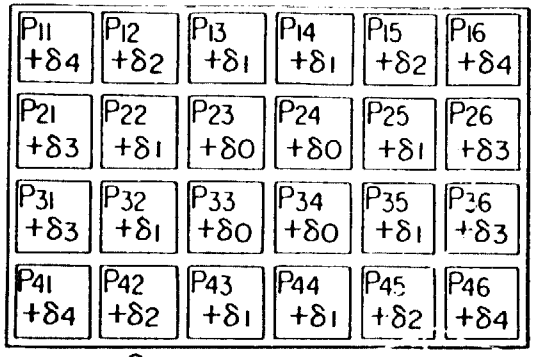
FIG. 8 illustrates the correspondency between the respective pattern sections and the respective correction values.

In the shown embodiment in which a picture plane is divided into 4×6=24 segments by photo receptors P11−P44, the number of correction values to be obtained by calculation reaches 24 in total, that is, δ11∼δ46. However, in general, lenses have such focusing characteristics that all the points in a lens lying on a concentric circle the center of which is the optical axis of the lens exhibit the same property. Therefore, for the sections equally distant from the center the same correction value may be used. For this reason, in case the metering system can be considered to have the same metering characteristics for every divisional area lying on a concentric circle with its center being the optical axis of the photographing lens, it is permissible to calculate the correction values as a function of the distance from the center of picture plane to the photo receptor. Namely, as seen from the following matrix formula and as illustrated in FIG. 8, five correction values δ0 . . . δ4 may be used as representatives of all the correction values:

$$[\delta ij] = \begin{bmatrix} \delta 11, \delta 12 \ldots \delta 16 \\ \delta ij \\ \delta 41 \qquad \delta 46 \end{bmatrix} = \begin{bmatrix} \delta 4 & \delta 2 & \delta 1 & \delta 1 & \delta 2 & \delta 4 \\ \delta 3 & \delta 1 & \delta 0 & \delta 0 & \delta 1 & \delta 3 \\ \delta 3 & \delta 1 & \delta 0 & \delta 0 & \delta 1 & \delta 3 \\ \delta 4 & \delta 2 & \delta 1 & \delta 1 & \delta 2 & \delta 4 \end{bmatrix} \quad (6)$$

In addition, as seen from FIGS. 5C, 6C and 7C, the following relation holds among the five correction values:

$$\left.\begin{array}{l} \delta 0 \geqq \delta 1 \geqq \delta 2 \geqq \delta 3 \geqq \delta 4 \\ \qquad\qquad\qquad\qquad \text{or} \\ \delta 0 \leqq \delta 1 \leqq \delta 2 \leqq \delta 3 \leqq \delta 4 \end{array}\right\} \quad (7)$$

In case the metering system has such metering characteristics which are symmetrical about right and left only relative to the picture plane, it is desirable that the representative correction values be calculated as a function of the distance from the bisector of the picture plane to the respective photoreceptors to obtain such correction values which are symmetrical about right and left and asymmetric relative to the vertical.

Figure 9:
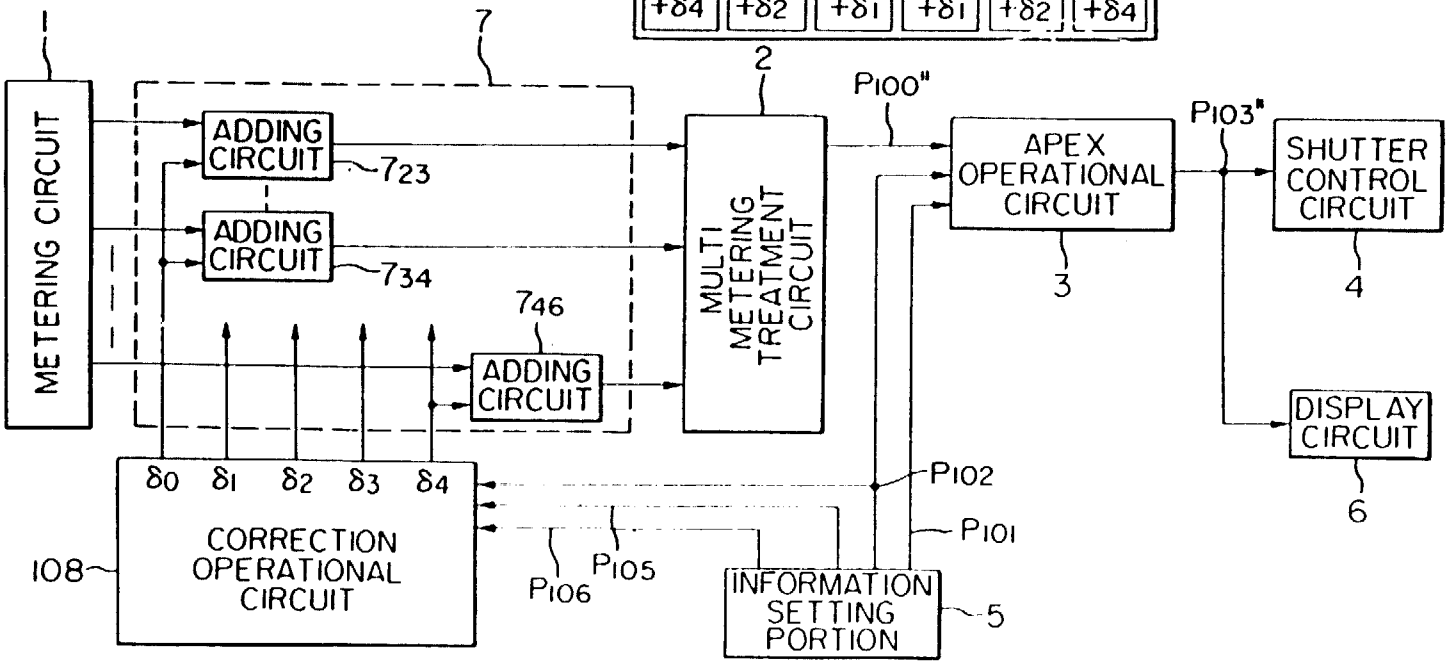
FIG. 9 is a block diagram of a second embodiment of the invention.

Making use of the above feature regarding the correction values, the embodiment shown in FIG. 4 can be simplified. FIG. 9 shows such simplified embodiment.

In FIG. 9, reference numeral 108 designates a correction value calculating circuit. The circuit 108 receives from the information setting portion 5 informations of the diameter of open aperture AV0 (=P105), aperture step number AV−AV0 (=P102) and lens signal L (=P106) and calculates the correction values δ0, δ1, . . . δ4 from the received informations.

In the correction operational circuit 7, addition is carried out so as to add δ0 to P23, P24, P33, P34; δ1 to P13, P14, P22, P25, P32, P35, P43, P44; δ2 to P12, P15, P42, P45; δ3 to P21, P26, P31, P36 and δ4 to P11, P16, P41, P46.

Figure 10:
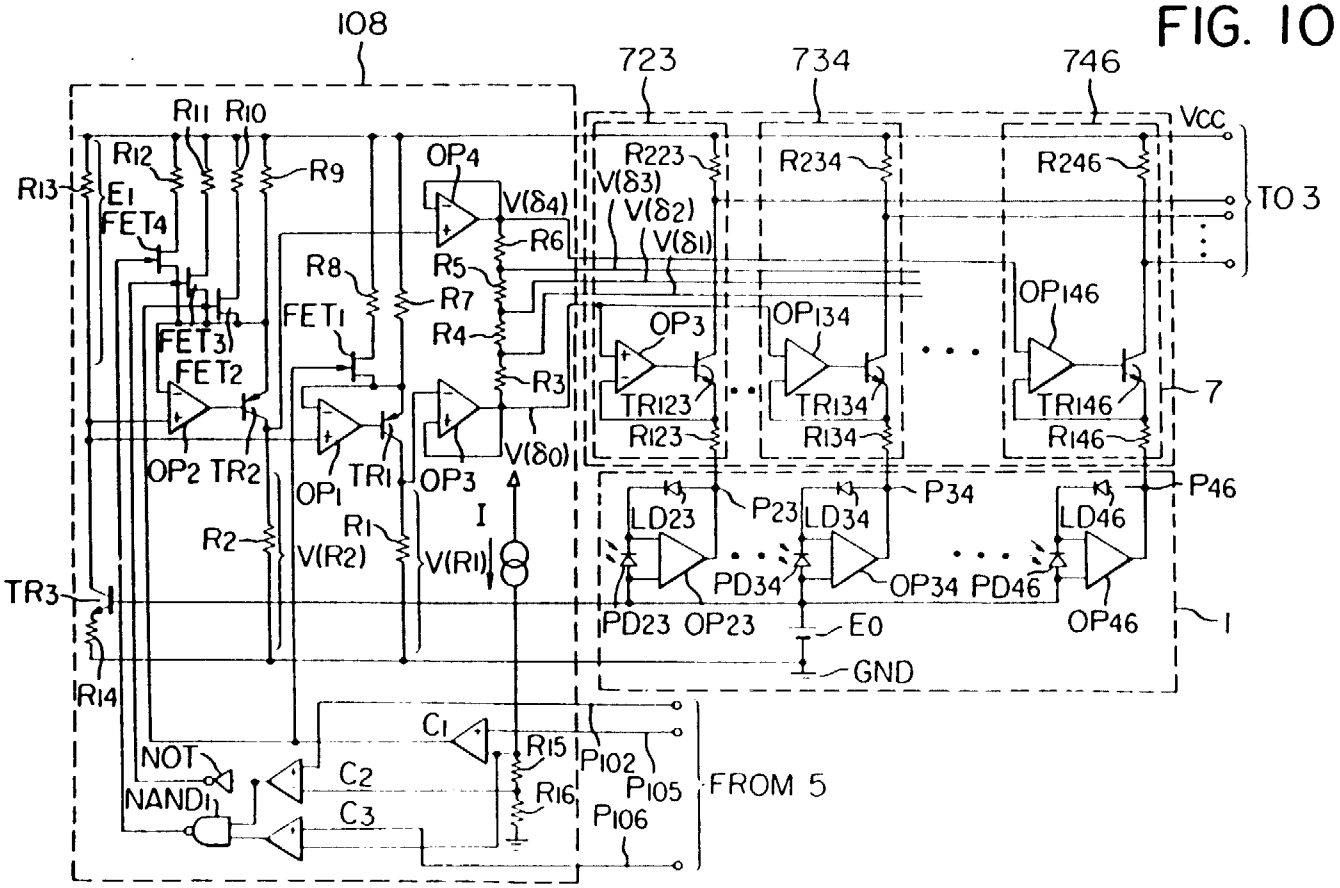
FIG. 10 is a circuit diagram of the second embodiment.

FIG. 10 shows a concrete form of the circuit used in the embodiment shown in FIG. 9.

In FIG. 10, the metering circuit generally designated by 1 is constituted of a number of metering blocks each comprising an operational amplifier OPij, a photo diode PDij and a logarithmic compression diode LDij. The number of metering blocks in the metering circuit 1 corresponds to the number of the divisional sections in the metered picture plane. A reference bias E0 is applied to the in-phase input to the amplifier OPij. Metering current generated in photo diode PDij is logarithmically compressed by the logarithmic compression diode LDij. The logarithmically compressed output is:

$$V(Pij) = E0 + (KT/q) \ln (ILij/IS) \quad (8)$$

The correction value calculating circuit 108 receives from the information setting portion 5 informations P105=AV0, P102=AV−AV0 and lens signal P106=L.

Information AV0 is introduced into the in-phase input terminal of comparator C1, information AV−AV0 into that of comparator C2 and signal L into that of comparator C3. Current I0 flows from a constant current source to resistors R15 and R16. A voltage I0 (R15+R16) is being applied to the inversion input terminals of comparators C1 and C3 and a voltage I0·R16 is being applied to the inversion input terminal of comparator C2.

Comparator C1 has logic "1" at its output when $$AV0 \geqq AV0th\ (I0(R15+R16)) \quad (9)$$

Comparator C2 has logic "1" at its output when $$(AV-AV0) \geqq (AV-AV0)th(=I0R16) \quad (10)$$

and the output is inverted by an inverting circuit NOT.

Comparator C3 has logic "1" at its output when $$L \geqq Lth(=I0(R15+R16)) \quad (11)$$

The output of NAND circuit becomes "0" only when both of the outputs from C2 and C3 are "1".

In other words, the output of comparator C1 is "0" when the lens has a fully open aperture value lower than a certain determined value (AV0)th and the output of the circuit NOT becomes "1" when the aperture step number is smaller than a certain determined value (AV- −AV0)th, namely when the aperture step number is a value near the open aperture for which correction is required.

Assuming that the signal L is a signal of focal length, the output of the circuit NAND becomes "0" when the lens has a focal length longer than a certain determined value and the aperture value is not near the open aperture value, namely when correction is required because of the use of a lens different from the reference lens.

A reference voltage E0 is being applied to between base and emitter of transistor TR3 and to between the base and resistor R14. Corrector current of TR3 is constant and therefore voltage at the both ends of resistor R13 is constant. This constant voltage is referred to as E1.

From the above it is undertood that to the non-inversion input terminals of operational amplifier OP1 and OP2 such voltage is being applied which is dropped from Vcc by E1. Output terminals of OP1 and OP2 are connected to bases of transistors TR1 and TR2 respectively and their inversion input terminals are connected to emitters of TR1 and TR2 respectively. Between the emitter of TR1 and Vcc there are connected resistor R7 and a circuit comprising a resistor R8 and a field effect transistor FET1. R7 and the circuit R8, FET1 are parallel to each other, and R8 and FET1 are connected in series. Resistor R1 is connected to between the collector of TR1 and GND. Similarly, between the emitter of TR2 and Vcc there are connected a circuit comprising a resistor 10 and a field effect transistor FET 2, a circuit comprising R11 and FET3, and a circuit comprising R12 and FET4 and a resistor R9 in parallel with each other. In each the circuit, resistor and field effect transistor are connected in series. Between the collector of TR2 and GND there is connected a resistor R2.

Owing to the property of operational amplifier, the voltage between the emitter of transistor TR1 and Vcc and between the emitter of TR2 and Vcc are kept always at E1. In a state of non-correction, the output of comparator C1 is "1" and FET is On. Therefore, emitter current of TR1 becomes (E1/R7+E1/R8). So long as hfe is high, the emitter current is equal to the collector current and therefore the voltage at the both ends of R1 is:

$$V(R1) = V(R1)\text{normal} = R1(1/R7 + 1/R8)E1 \ldots \text{non-correction} \quad (12)$$

This voltage is the bias voltage to be applied to the photoelectric output from the central area.

On the other hand, for a larger relative aperture lens, the output of comparator C1 is "0" and FET is turned off. Therefore, the collector current of TR1 becomes E1/R7 only. Namely, $$V(R1) = \frac{R1}{R7} E1 = V(R1)\text{normal} - \frac{R1}{R8} E1 = V(R1)\text{normal} - V_{fo}\ \text{comp 1} \quad (13)$$

. . . correction for large relative aperature

The second term is the correction term to the central area for a larger relative aperture.

In a state of non-correction as to the peripheral area, the output of comparator C1 to "1" the output of NOT is "0" and the output of NAND is "1". FET 2 and FET 4 become On and FET 3 becomes Off. Therefore, the collector current of TR2 is (1/R9+1/R10+1/R12) E1 and the voltage at the both ends of resistor R2 is:

$$V(R2) = V(R2)\text{normal} = R2(1/R9 + 1/R10 + 1/R12)E1 \ldots \text{non-correction} \quad (14)$$

This voltage is the bias voltage to the peripheral area in the case of non-correction. In case that correction for larger relative aperture lens is required, the output of comparator C1 becomes "0" and FET is turned OFF. Therefore, $$V(R2) = R2\left(\frac{1}{R9} + \frac{1}{R12}\right) E1 = V(R2)\text{normal} - \frac{R2}{R10} E1 = V(R2)\text{normal} - V\ \text{fo comp 2} \quad (15)$$

. . . correction for large relative aperture

The second term is the correction term to the peripheral area in the case of large relative aperture.

When correction is required for fully open aperture, the output of NOT becomes "1" and FET3 in turned On. Therefore, $$V(R2) = R2(1/R9 + 1/R10 + 1/R11 + 1/R12)E1 = V(R2)\text{normal} + (R2/R11)E1 = V(R2)\text{normal} + Vf - fo, \text{comp} \ldots \text{correction for fully open aperture} \quad (16)$$

The second term is the correction term for fully open aperture which is applied only to the peripheral area of the picture plane.

When correction is required for difference in lens optical system, the output of NAND becomes "0" and FET4 is Off. Therefore, $$V(R2) = R2\left(\frac{1}{R9} + \frac{1}{R10}\right) E1 + V(R2)\text{normal} - \frac{R2}{R12} E1 = V(R2)\text{normal} - V_{L,\ comp} \quad (17)$$

. . . correction for optical system the second term is the correction term for difference in lens optical system which is also applied to only the peripheral area of the picture plane.

Operational amplifiers OP3 and OP4 constitute voltage follower circuits and inputs V(R1) and V(R2) to OP3 and OP4 become outputs from OP3 and OP4 as they are.

Between the output terminals of operational amplifiers OP3 and OP4 there are connected resistors R3, R4, R5 and R6 in series. Let V(δ0), V(δ1), . . . V(δ4) denote their terminal voltages respectively. Then, $$V(\delta 0) = V(R1) \quad (18)$$

$$V(\delta 1) = V(R1) + \frac{R3}{R3 + R4 + R5 + R6}\{V(R2) - V(R1)\} \quad (19)$$

$$V(\delta 2) = V(R1) + \frac{R3 + R4}{R3 + R4 + R5 + R6}\{V(R2) - V(R1)\} \quad (20)$$

$$V(\delta 3) = V(R1) + \frac{R3 + R4 + R5}{R3 + R4 + R5 + R6}\{V(R2) - V(R1)\} \quad (21)$$

$$V(\delta 4) = V(R2) \quad (22)$$

These terminal voltages V(δ0) . . . V(δ4) are outputs from the correction value calculating circuit corresponding to δ0 . . . δ4 in the block diagram shown in FIG. 9.

Figure 11:
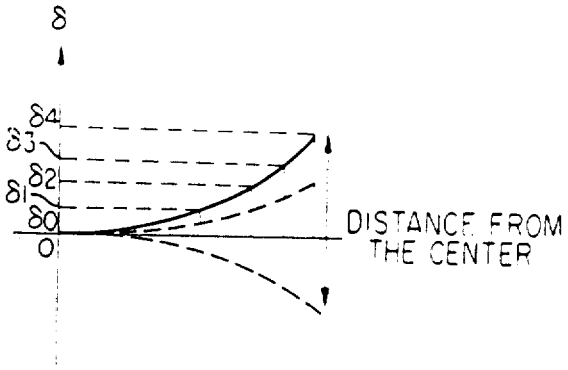
FIG. 11 is a graph showing a relation curve of correction values.

FIG. 11 is a graph in which correction value δ is plotted on the ordinate and the distance from the center of the picture plane on the abscissa. It is seen from the graph that the correction value δ changes describing a curve. The curve is variable in accordance with the content of correction as suggested by dotted line curves. However, the following relations hold for almost all of the cases:

$$\delta 1-\delta 0:\delta 2-\delta 0:\delta 3-\delta 0:\delta 4-\delta 0=K1:K2:K3:1 \quad (23)$$

where, K1, K2, K3 are constants.

Determine the constants as follows:

$$R3/(R3+R4+R5+R6)=K1 \quad (24)$$

$$(R3+R4)/(R3+R4+R5+R6)=K2 \quad (25)$$

$$(R3+R4+R5)/(R3+R4+R5+R6)=K3 \quad (26)$$

Then, $$V(\delta 0)=V(R1) \quad (18)$$

$$V(\delta i)=V(R1)+Ki\{V(R2)+V(R1)\}(i=1,2,3) \quad (27)$$

$$V(\delta 4)=V(R2) \quad (22)$$

Thus, above corrections can be carried out. Referring again to FIG. 10, the correction operational circuit 7 is constituted of a number of blocks 723, . . . 734, . . . 746 each block comprising an operational amplifier (OP1ij), a transistor (Tr1ij) and two resistors (R1ij and R2ij). By way of example, operation relating to photoelectric output P23 will be described in detail hereinunder.

When the output V(δ0) from the correction value calculating circuit 108 is applied to the non-inversion input terminal of operational amplifier OP123, the emitter voltage of transistor TR123 becomes V(δ0). Since the output V(P23) from OP23 in the metering circuit 1 is being applied to another end of resistor R123, the current flowing through R123 is {V(δ0)−V(P23)}/R123. So long as hfe of TR123 is sufficiently high, emitter current≈collector current. Therefore, the current flowing through R123 is equal to that flowing through R233. From R123=R223, the voltage V23 at the both ends of resistor R223 becomes:

$$V23 = V(\delta 0) - V(P23) \quad (28)$$

Similarly, $$V24 = V(\delta 0) - V(P24) \quad (29)$$

$$V33 = V(\delta 0) - V(P33) \quad (30)$$

$$V34 = V(\delta 0) - V(P34) \quad (31)$$

$$V13 = V(\delta 1) - V(P13) \quad (32)$$

.

.

.

$$V46 = V(\delta 4) - V(P46) \quad (33)$$

The sign in the above formula is inverse to that in formula (5). This is merely by reason of the circuit structure.

Hereinafter the manner of entering necessary corrections will be described in detail.

At first description is made of the case where no correction is necessary. In this case, the formulas (12) and (14) hold and therefore $$V(\delta 0)=V(R1)normal \quad (34)$$

$$V(\delta 4)=V(R2)normal \quad (35)$$

V(R1)normal and V(R2)normal are not always equal to each other. This is because a substantial portion of the initial shift of photoelectric output may be incorporated into V(R1)normal, V(R2)normal. It is also possible to add a dark current term and/or temperature compensation term. At the time, outputs for other parts are obtained from the above formulas (28)–(33) as follows:

$$V(\delta i)=V(R1)normal+Ki\{V(R1)normal-V(R2)normal\}(i=1,2,3) \quad (36)$$

Since they change little by little, there occurs no conflict.

These outputs are, together with the metering outputs V(Pij), introduced into the correction operational circuit 7 which has then the following outputs:

$$V23 = V(R1)normal - V(P23) \quad (37)$$

.

.

.

$$V13 = V(R1)normal + K1\{V(R2)normal - V(R1)normal\} - V(P13) \quad (38)$$

.

.

.

$$V46 = V(R2)normal - V(P46) \quad (39)$$

When correction is required for a lens of large relative aperture, the correction value calculating circuit 108 detects it by comparator C1 and issues outputs in accordance with formulas (13) and (15). Thus, the following outputs are obtained:

$$V(\delta 0) = V(R1)normal - Vfo\ comp1 \quad (40)$$

$$V(\delta i) = V(R1)normal + Ki\{V(R2)normal - V(R1)normal\} - Vfo,\ comp1 - Ki(Vfo\ comp2 - Vfo\ comp1)\ (i = 1,2,3) \quad (41)$$

$$V(\delta 4) = V(R2)normal - Vfo\ comp2 \quad (42)$$

Outputs from the correction operational circuit 7 are:

$$V23 = V(R1)normal - V(P23) - Vfo\ comp1 \quad (43)$$

.

.

.

$$V13 = V(R1)normal + K1\{V(R2)normal - V(R1)normal\} - \quad (44)$$

-continued $$V(P13) - Vfo\ comp1 - K1(Vfo\ comp2 - Vfo\ comp1)$$

$$V46 = V(R2)normal - V(P46) - Vfo\ comp2 \quad (45)$$

Comparing the outputs before correction with the outputs after correction while omitting the respective bias terms, the following correspondency is seen:

$$V(P23)\equiv V(P23) + Vfo\ comp1 \quad (46)$$

$$V(P13)\equiv V(P13) + (1 - K1)Vfo\ comp1 + K1Vfo\ comp2 \quad (47)$$

$$V(P46)\equiv V(P46) + Vfo\ comp2 \quad (48)$$

The second and the following terms in the right member of the above equations constitute correction terms for the corresponding sections. Vfo comp1 is a correction term which has been used also in the aforementioned conventional metering system with single photoelectric output wherein the central area of a picture plane is primarily metered. This correction term serves to compensate the drop in photoelectric output at the central area in the case of large relative aperture lens. The value of this correction term is relatively small. On the contrary, Vfo comp2 is a correction term serving to compensate the output from the area most distant from the center of a picture plane and therefore its value is relatively large (see FIG. 5C). To the intermediate distant area there is applied an intermediate correction value which increases up gradually toward the periphery of the picture plane. Information of photoelectric outputs corrected in this manner is delivered to the multi metering treatment circuit 2.

When correction is required in the state of fully open aperture, comparator 2 and NOT circuit detect the state of aperture and the correction value calculating circuit 108 has the following values in accordance with formulas (12) and (16):

$$V(\delta 0) = V(R1)normal \quad (34)$$

$$V(\delta i) = V(R1)normal + Ki\{V(R2)normal - V(R1)normal\} + KiVf\text{-}fo,\ comp(i = 1, 2, 3) \quad (49)$$

$$V(\delta 4) = V(R2)normal + Vf\text{-}fo,\ comp \quad (50)$$

Therefore, the outputs from the correction operational circuit 7 become:

$$V23 = V(R1)normal - V(P23) \quad (37)$$

$$V13 = V(R1)normal - Ki\{V(R2)normal - V(R)normal\} - V(P13) + KiVf\text{-}fo,comp(i = 1,2,3) \quad (51)$$

$$V46 = V(R2)normal - V(P46) + Vf\text{-}fo,comp \quad (52).$$

Omit the bias terms and compare the outputs before correction with those after correction. Then, the following correspondency is seen:

$$V(P23)\equiv V(P23) \quad (53)$$

$$V(P13)\equiv V(P13) - KiVf\text{-}fo,comp \quad (54)$$

$$V(P46)\equiv V(P46) - Vf\text{-}fo,comp \quad (55)$$

As for the central part, the photoelectric output remains uncorrected. As to other parts, a negative correction value is added which increases gradually toward the edge portion of the picture plane. This means that the correction illustrated in FIG. 6C is performed.

Lastly, description is made of the case where correction is required by reason of the difference in type of optical system of the lens then used.

When such lens is used for which a correction is necessary, comparator C3 detects the type of lens and comparator detects that the aperture value is not at or near its fully open aperture value. When both of the comparators have detected the requirements for such correction, NAND issues an output informing of the necessity of correction. At the time, the correction value calculating circuit 108 has the following outputs in accordance with formula (12) and (17):

$$V(\delta o) = V(R1)normal \quad (34)$$

$$V(\delta i) = V(R1)normal + Ki\{V(R2)normal - V(R1)normal\} - KiV_L,comp(i = 1,2,3) \quad (56)$$

$$V(\delta 4) = V(R2)normal - V_L,comp \quad (57).$$

Thereby, the outputs from the correction operational circuit become:

$$V23 = V(R1) - V(P23) \quad (37)$$

$$V13 = V(R1normal + Ki\{V(R2)normal - V(R1)normal\} - V(P13) - KiV_L,comp(i = 1,2,3) \quad (58)$$

$$V46 = V(R2)normal - V(P46) - V_L,\ comp \quad (59).$$

Omitting the bias terms and comparing the outputs before correction with those after correction, the following correspondency is seen:

$$V(P23)\equiv V(P23) \quad (53)$$

$$V(P13)\equiv V(P13) + KiV_L,comp \quad (60)$$

$$V(P46)\equiv V(P46) + V_L,comp \quad (61).$$

It is seen from the above that the photoelectric output of the central area remains uncorrected and that to the photoelectric output of the peripheral area is added a positive correction value which increases gradually toward the edge portion of the picture plane. This means that the correction illustrated in FIG. 7C is performed.

In the above, the respective corrections have been described independently of each other. In case a picture is to be taken using a lens having a large relative aperture and at its fully open aperture value, the correspondency between the outputs before correction and those after correction will be represented by:

$$V(P23)\equiv V(P23) + Vfo,comp1 \quad (46)$$

$$V(P13)\equiv V(P13) + (1 - Ki)Vfo,comp1 + KiVfo,comp2 - KiVf\text{-}fo,comp \quad (62)$$

$$V(P46)\equiv V(P46) + Vfo,comp2 - Vf\text{-}fo,comp \quad (63).$$

As seen from the above, in this case, the respective correction terms act in such direction that one negates the other. This means that use of such lens that is strongly affected by vignetting, at an aperture value near the fully open aperture is substantially equivalent to use of an ordinary lens at an ordinary aperture value.

While in the above embodiment various informations to be put in the correction value calculating circuit 108 from the information setting part 5 have been divided into two groups using the same reference level, it should be understood that two or more reference levels may be used to further improve the accuracy of correction.

In the above embodiments, the present invention has been applied to a camera with aperture priority type automatic exposure control. As hereinafter described, the present invention is applicable also to a camera with shutter speed priority type automatic exposure control and a program control type of camera wherein shutter speed or aperture value is controlled in accordance with a program.

In these types of cameras (shutter speed priority type and program control type), metering is generally carried out with the aperture stop for photographing lens being preset to the minimum aperture value. Information transmitted to the main body of the camera from the lens is that of said preset aperture value. Any information of the aperture value actually controlled at the time of the shot is not transmitted. Of course there is the possibility that the aperture value actually controlled at the time of the shot may be a value near the open aperture value. To attain the correction for fully or nearly opened aperture in accordance with the present invention, considering the above possibility, it is required, therefore, to introduce information of the actually controlled aperture value into the main body of such type of camera from the lens.

Figure 12:
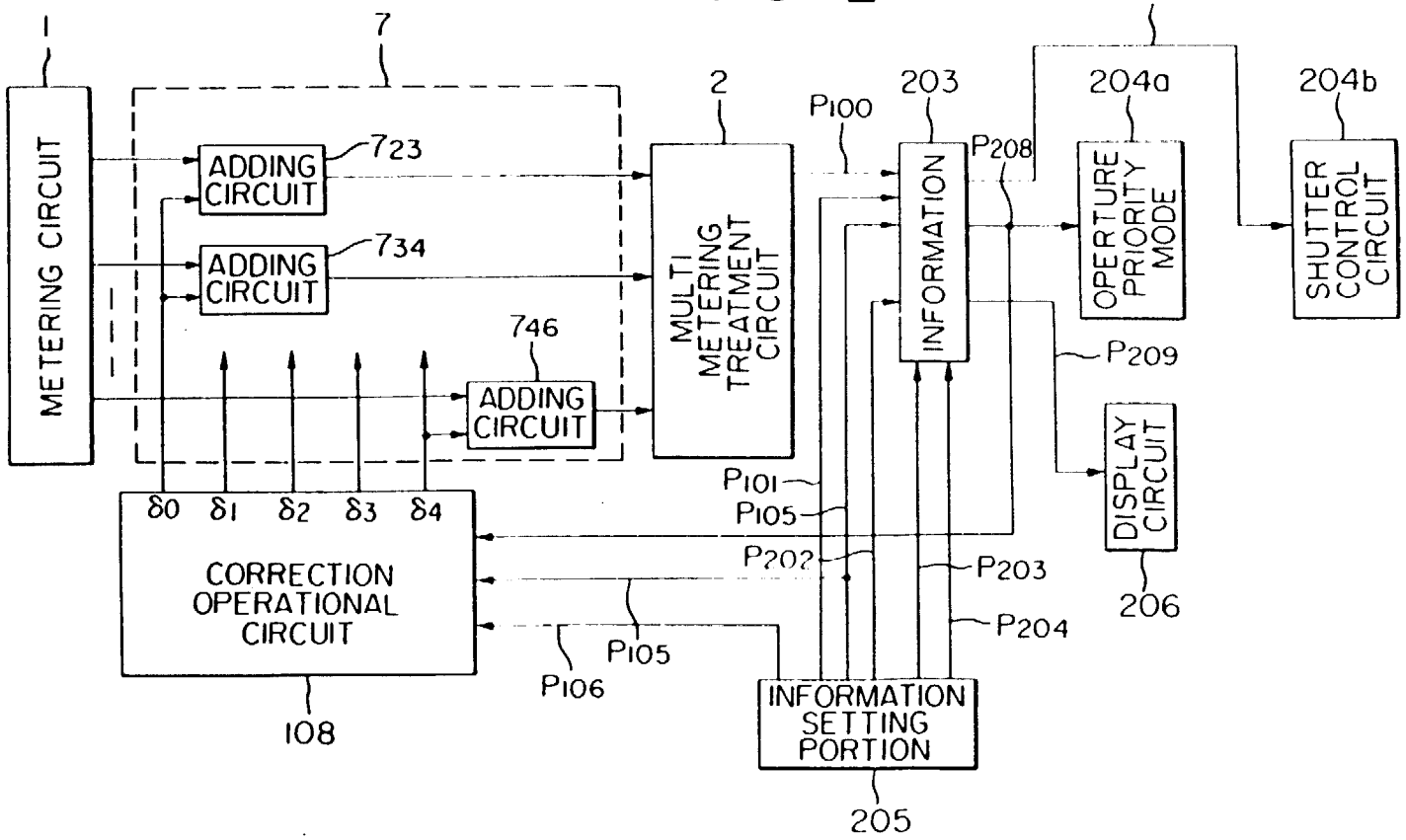
FIG. 12 is a block diagram of a third embodiment of the invention.

FIG. 12 shows a further embodiment in which the present invention is applied to a camera provided with two automatic exposure control modes, namely aperture priority mode and shutter speed priority mode. Information of the actually controlled aperture value issued from an exposure operational circuit is introduced into the above described correction value calculating circuit.

In FIG. 12, the information setting part designated by 205 generates information of preset aperture value $P202=(AV-AV0)_M$, information of preset shutter speed $P203=TV_M$ and information of selected mode P204 in addition to ASA speed value information $P101=SV$, fully open aperture information $P105=AV0$ and lens signal $P106=L$. Thus, information of preset aperture value used in taking a picture in aperture priority mode is given by $P202=(AV-AV0)_M$ and information of preset shutter speed used in taking a picture in shutter speed priority mode is given by $P203=TV_M$. Of six informations mentioned above, $P101=SV$, $P105=AV0$, $P202=(AV-AV0)_M$, $P203=TV_M$ and P204 are put in APEX operational circuit 203 which receives also the operational output $P100''=BV''ans-AV0$ from a multi metering treatment circuit 2 which is the same as that in FIG. 9 in structure and function. APEX operational circuit 203 carries out the following APEX operations based upon the received data (affix "M" means set value):

For example, when aperture priority mode is selected by mode information P204, the operational circuit gives to the aperture control circuit 204a the following aperture control signal:

$$P204=P203=(AV-AV0)_M \quad (64)$$

and to the shutter control circuit 204b the following shutter speed control signal:

$$P207 = P100'' + P101 - P202 \quad (65)$$
$$= (BV''ans - AV0) + SV - (AV - AV0)_M = TV.$$

To the display circuit 206 it gives the following display signal to indicate the shutter speed:

$$P209=P207=TV \quad (66).$$

When the shutter speed priority mode is selected by mode information P204, the following aperture control signal is given to the aperture control circuit 204a:

$$P208 = P100'' + P101 - P203 \quad (67)$$
$$= (BV''ans - AV0) + SV - TV_M = AV - AV0$$

and the following shutter control signal is given to the shutter control circuit 204b:

$$P207=P203=TV_M \quad (68)$$

At the same time the following display signal is given to the display circuit 206 to display the controlled aperture value:

$$P209=P105+P208=AV0+(AV-AV0)=AV \quad (69).$$

The correction value calculating circuit 108 receives the open aperture information $P105=AV0$ and lens signal $P106=L$ from the information setting part 205 and, when shutter priority mode is selected, the aperture control signal $P208=AV-AV0$ from APEX operational circuit and operates in the same manner as in the embodiment shown in FIG. 9.

While in the above embodiment APEX operational circuit 203 has given the same aperture control signal $(AV-AV0)$ to the aperture control circuit 204a and the correction value calculating circuit 8 to control them, signal applied to the circuit 204a and signal to the circuit 8 are not always necessary to be the same. Information which the correction value calculating circuit 8 requires is such information informing of whether the aperture value is near to the fully open aperture or not. On the contrary, the aperture control circuit 204a requires, in some case, a different information from the above to control the aperture according to the type of control system. For example, in the case of such control system where after releasing the quantity of light is continuously monitored and the driving of aperture stop is stopped when the quantity of light $(BV-AV)$ has just reached a determinate value, the signal to be delivered to the aperture control circuit is $TV-SV$. Therefore, when $$BV-AV=TV-SV \quad (70)$$

holds, a proper exposure value is obtained.

Also, while the present invention has been described mainly with reference to the case of metering with open aperture, the invention is applicable also to the case of metering with stopped down aperture wherein error of metering may take place for the same reason as above, in particular at the peripheral area of a picture plane.

The present invention is also useful for correcting such error. It is therefore to be understood that within the scope of the appended claims, the invention may be practiced otherwise than as specifically described with reference to preferred embodiments thereof.

What we claim is:

1. An exposure control apparatus for a camera comprising:

(a) a metering circuit for metering the field of an object while dividing said field into a plural number of sections to generate a plural number of photoelectric outputs corresponding to said sections respectively;

(b) an exposure operational circuit for calculating an exposure value from said photoelectric outputs;

(c) a correction value calculating circuit for calculating correction values corresponding to said sections of the object field respectively to correct the distribution characteristics of said photoelectric outputs relative to the distribution characteristics of illumination on the focal plane of the photographing lens of the camera at the time of photographing; and (d) a correction operational circuit for correcting said individual photoelectric outputs in accordance with the calculated correction values.

2. An exposure control apparatus according to claim 1 which further comprises means for generating information relating to the photographing lens and wherein said correction value calculating circuit calculates said correction values relying upon said information from said information generating means.

3. An exposure control apparatus according to claim 2 wherein said information generating means includes information setting means engageable with the photographing lens and generates at least one information selected from the group consisting of information of fully open aperture value of said photographing lens, information of aperture value controlled at the time of photographing, information of the difference between said open aperture value and said controlled aperture value, information of focal length of said photographing lens and information of exit pupil distance of said photographing lens.

4. An exposure control apparatus according to claim 1 wherein said correction value calculating circuit receives the output from said exposure operational circuit and calculates said correction values from said exposure value.

5. An exposure control apparatus according to claim 4 which further comprises means for setting shutter speed and wherein said exposure operational circuit calculates from the shutter speed set by said means an aperture value to be controlled for obtaining a proper exposure and issues said calculated aperture value to said correction value calculating circuit.

6. An exposure control apparatus according to claim 5 which further comprises means for detecting the open aperture value of said photographing lens and wherein said exposure operational circuit issues an output indicative of the difference between said calculated aperture value and said open aperture value.

7. An exposure control apparatus according to claim 1 wherein said correction value calculating circuit includes a circuit making for a plural number of different correction signals related to the respective locations allotted for said respective sections within said object field.

8. An exposure control apparatus according to claim 7 wherein said correction operational circuit includes a circuit for causing said correction signals to correspond to said photoelectric outputs respectively.

9. An exposure control apparatus according to claim 7 wherein said correction value calculating circuit includes a circuit for calculating the same correction value for those sections which are located symmetrical with respect to each other within said object field.

*10. In a camera provided with a photographing lens, an apparatus for determining a proper exposure for an object field to be photographed comprising:*

*(a) metering means for metering the object field while dividing said field into a plural number of sections to generate a plural number of photoelectric outputs corresponding to said sections respectively;*

*(b) means for producing correction values corresponding to said sections of the object field respectively to correct the distribution characteristics of said photo-electric outputs relative to the distribution characteristics of illumination on the focal plane of the photographing lens of the camera at the time of photographing;*

*(c) correction operational means for correcting said individual photoelectric outputs in accordance with the correction values; and*

*(d) exposure operational means for determining an exposure value from said photoelectric outputs corrected by said correction operational means.*

*11. An apparatus according to claim 10 which further comprises means for generating information relating to the photographing lens and wherein said correction value producing means produces said correction values relying upon said information from said information generating means.*

*12. An apparatus according to claim 11, wherein said information generating means includes information setting means engageable with the photographing lens and generates at least one information selected from the group consisting of information of a fully open aperture value of said photographing lens, information of an aperture value controlled at the time of photographing, information of the difference between said open aperture value and said controlled aperture value, information of a focal length of said photographing lens and information of an exit pupil distance of said photographing lens.*

*13. An apparatus according to claim 10, wherein said correction value producing means receives the output from said exposure operational means and produces said correction values from said exposure value.*

*14. An apparatus according to claim 13 which further comprises means for setting shutter speed and wherein said exposure operational means determines from the shutter speed set by said means an aperture value to be controlled for obtaining said proper exposure and issues said determined aperture value to said correction value producing means.*

*15. An apparatus according to claim 14 which further comprises means for detecting the open aperture value of said photographing lens and wherein said exposure operational means issues an output indicative of the difference between said determined aperture value and said open aperture value.*

*16. An apparatus according to claim 10, wherein said correction value producing means includes means for making a plural number of different correction signals related to the respective locations allotted for said respective sections within said object field.*

*17. An apparatus according to claim 16, wherein said correction operational means includes means for causing*

*said correction signals to correspond to said photoelectric outputs respectively.*

*18. An apparatus according to claim 16, wherein said correction value producing means includes means for producing the same correction value for those sections which are located symmetrical with respect to each other within said object field.*

*19. An apparatus according to claim 10, wherein said camera comprises means for controlling an exposure in accordance with said exposure value determined by said exposure value determined by said exposure operational means.*

*20. An apparatus according to claim 10, wherein said camera comprises means for indicating information relating to an exposure in accordance with said exposure value determined by said exposure operational means.*

• • • • •